United States Patent
Taylor

Patent Number: 5,414,953
Date of Patent: May 16, 1995

[54] OPEN FACE TACKLE BOX

[76] Inventor: Charles Taylor, 106 Vance Pl., Long Beach, Miss. 39560

[21] Appl. No.: 218,133

[22] Filed: Mar. 25, 1994

[51] Int. Cl.6 ................... A01K 97/10; A01K 97/00
[52] U.S. Cl. ........................................ 43/54.1; 43/21.2
[58] Field of Search ............... 43/21.2, 54.1, 57.1; 206/315.11; 224/922; 248/520

[56] References Cited

U.S. PATENT DOCUMENTS

| | | | |
|---|---|---|---|
| 908,903 | 1/1909 | Thornton | 43/54.1 |
| 1,318,007 | 10/1919 | Gau | 43/21.2 |
| 2,555,073 | 5/1951 | Zdankowski | 43/54.1 |
| 2,774,563 | 12/1956 | Pribis | 43/21.2 |
| 4,311,262 | 1/1982 | Mogin | 43/54.1 |
| 4,594,805 | 6/1986 | McClelland | 43/21.2 |
| 4,815,593 | 3/1989 | Brown | 43/54.1 |
| 4,848,021 | 7/1989 | Simko | 43/21.2 |
| 4,953,318 | 9/1990 | Vasseur | 43/21.2 |
| 5,025,584 | 6/1991 | Butterwick | 43/21.2 |

*Primary Examiner*—Kurt Rowan
*Attorney, Agent, or Firm*—Pravel, Hewitt, Kimball & Krieger

[57] ABSTRACT

An open box for carrying fishing tackle, including rods and reels, in a controlled manner permitting the fisherman to easily control and carry all the necessary equipment for fishing in one hand, giving ready access and some degree of protection to the articles being carried. The box is in the form of an open shallow container having two dividing cross partitions, each of which is slotted for carrying one or two fishing rods complete with line and reels on each side.

3 Claims, 2 Drawing Sheets

OPEN FACE TACKLE BOX

BACKGROUND OF THE INVENTION

This invention pertains to the field of tackle boxes and accessory containers for fishermen usage.

Many forms of box or container are known for aiding fishermen in carrying, as well as storage, of fishing accessories, lures and the like to and from a fishing site. Such tackle boxes are typically in the form of closed boxes having many internal small compartments for separating and sorting lures, hooks and similar small components.

However, the portability of fishing equipment renders the carriage of all the fishing equipment in such boxes difficult. Typically, a fisherman carries two or three rods and reels together with tackle, lures, line, accessories and the like. There is a need for a box which conveniently holds and controls and carries such dissimilar items as a complete rod and reel on the one hand and an assortment of lures and hooks on the other.

SUMMARY OF THE INVENTION

The invention is an open box for carrying fishing tackle, including rods and reels, in a controlled manner which permits the fisherman to easily control and carry all the necessary equipment for fishing in one hand, giving ready access and some degree of protection to the articles being carried.

The box is in the form of an open shallow container having two dividing cross partitions or frames, each of which is slotted for carrying one or two fishing rods complete with line and reels on each side. Typically, the box can carry up to a maximum of four rods with reels, holding them in a protected position with the tips extending forward in the box so that they can be readily seen by the fisherman as he walks forward. The tray underlying the box may be contain any number of containers or individual loose items, as the fisherman finds necessary for fishing.

The box is supported by an elongated counter-levered handle which both strengthens the box and provides significant weight carrying capability. The extended shape of the handle permits the fisherman to balance the box by placing his hand along the handle to a position where the box is balanced for easy carriage. By making the handle an elongate cantilevered handle, the fisherman is able to load varying loads having varying centers of gravity within the tackle box.

It is, thus, an object of the invention to show a tackle box which is of particular use in carrying both fishing tackle and small items, as well as complete rod and reel assemblies.

It is a further object of the invention to show a tackle box which has particular utility in carrying and protecting multiple rods, with attached fishing reels, while permitting easy control of the rods, reducing the risk of accidental striking with or breakage of the tips of the rods.

It is a further object of the invention to show a tackle box which adds life to reels by reducing the risk of sand or dirt contamination of reels which occurs when rods are placed or dropped in dirt.

It is a further object of the invention to show a tackle box which aids handicapped fishermen in manipulating rods and tackle.

It is a further object of the invention to disclose a fishing tackle box which is easy to carry under varying loads and centers of gravity.

This and other objects of the invention may be more clearly seen from the detailed description of the preferred embodiment which follows.

DETAILED DESCRIPTION OF THE INVENTION

Figure 1:
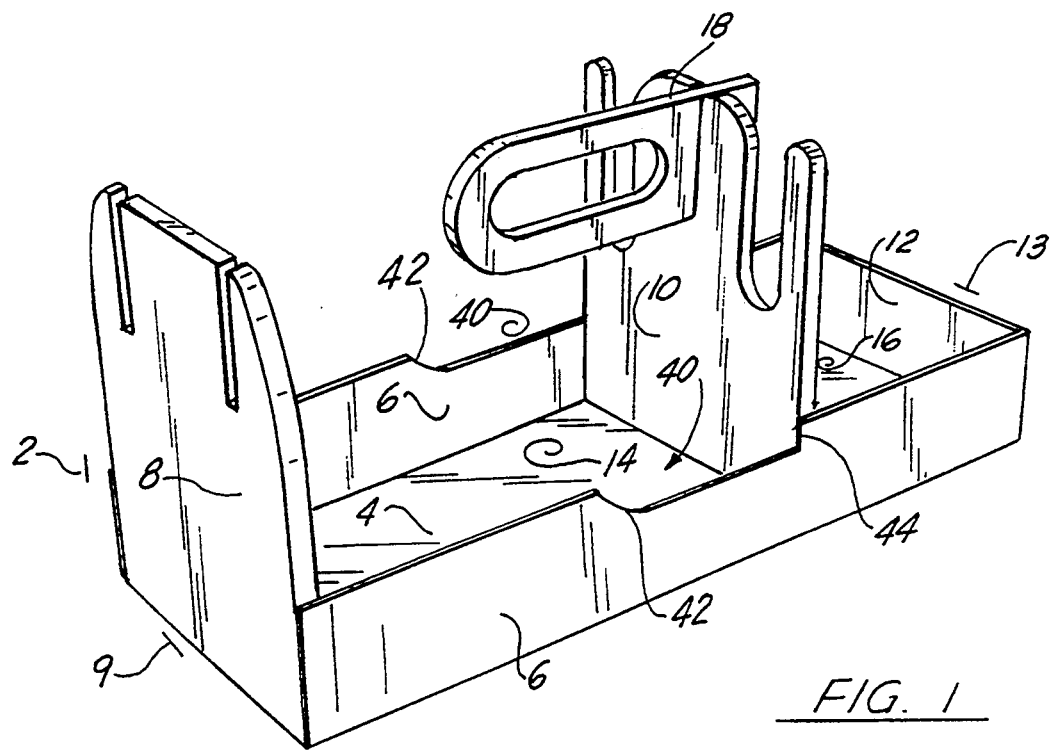
FIG. 1 is an angled view of the assembled tackle box of the invention.
Figure 2:
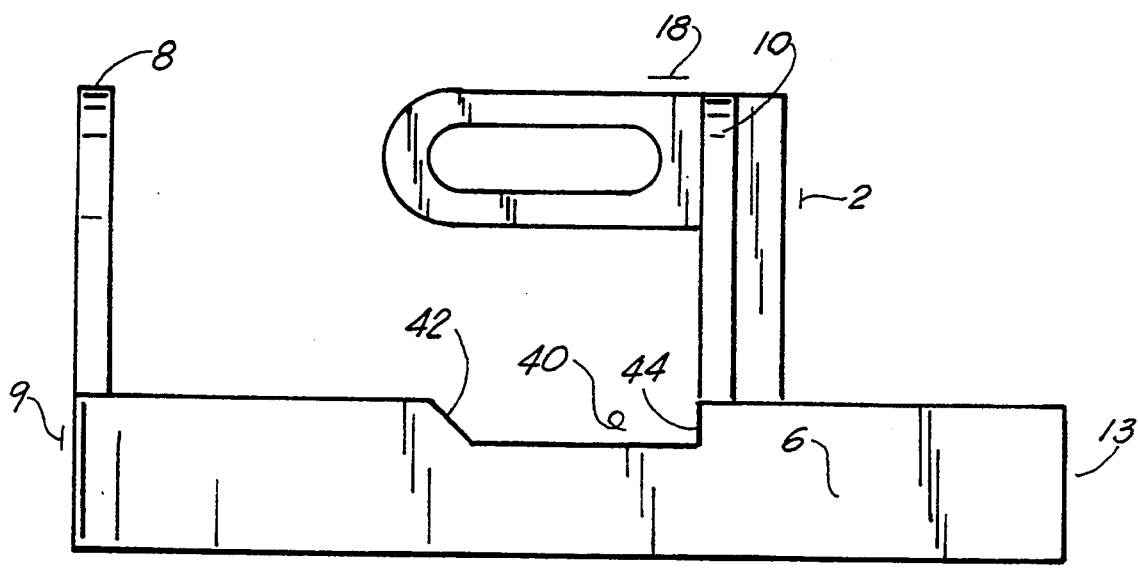
FIG. 2 is a side view of the assembled tackle box of the invention.

Referring primarily to FIG. 1, we show the inventive tackle box 2 as an elongated shallow box having width and length determined by the dimensions of a base plate 4 which forms the bottom of the box. Two side walls 6 extend from the front 9 to the rear 13 of the box on each side. At the front 9 of the tackle box 2 is end frame 8, a vertically arising partition divider which defines the front 9 of the box. At approximately two-thirds of the way to the rear of the box, a cross mid-frame 10 is fastened to and extends from one side wall 6 along the base plate 4 to the other side wall 6. At the rear end of base plate 4 is an end wall 12 of a height equal to the height of side wall 6; end wall 12 forms the rear 13 of the tackle box 2.

Mid-frame 10 partitions and divides the storage area of the tackle box 2 into two sections: a large storage partition area 14 extending from the end frame 8 to the mid-frame 10 and a smaller storage partition area 16 extending from the mid-frame 10 to the end wall 12.

Figure 4:
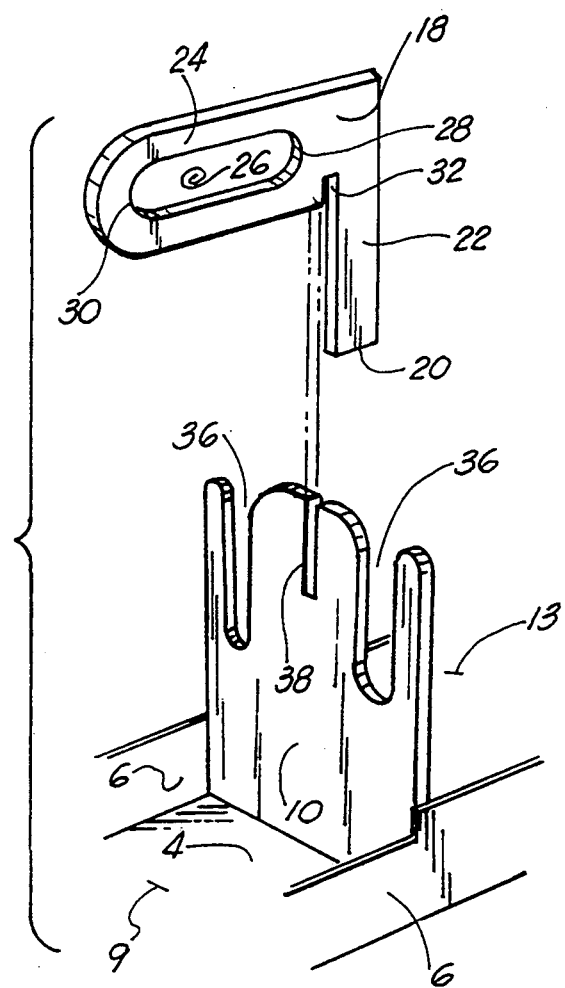
FIG. 4 is an exploded view of the cantilevered handle and support spine of the invention fit into the mid-frame of the invention.

The box is supported and suspended in a balanced manner by handle assembly 18. Handle assembly 18 may be seen most clearly in FIG. 4 as an assembly having a base edge 20 adapted to fit and be fastened to the base plate 4 of the tackle box. From base edge 20 the handle assembly 18 forms a rising handle assembly spine 22, a relatively wide section of the handle which runs perpendicular to mid-frame 10 and extends along and is connected to the mid-frame 10 along the rear face of the mid-frame 10.

At the upper end of handle assembly 20 is a handle assembly grip section 24. Grip section 24 is an elongate section having an elongate grip opening 26 which is designed to be at least as wide as two hand widths and may preferably be longer. Grip section 24 should extend for at least one-quarter of the overall length of the base plate 4, extending from a grip rear end 28 to a grip front end 30.

Handle assembly spine 22 is in full contact with the rear of mid-frame 10 and is secured to mid-frame 10 periodically by screws, glue and the like. In addition, a handle assembly interlocking notch 32 is cut into a portion of the handle assembly grip section 24. Interlock notch 32 in turn connects to and interlocks with a mid-frame handle assembly interlock notch 38. These notches provide for additional rigidity in strength, especially when glued together upon assembly of the handle assembly 18 into and against the mid-frame 10.

End frame 8 is provided with two relatively narrow but fairly deep end frame pole notches 34. Pole notches 34 are sized to be slightly larger than the average diameter of the typical fishing pole and about the mid-length of the fishing pole.

Figure 3:
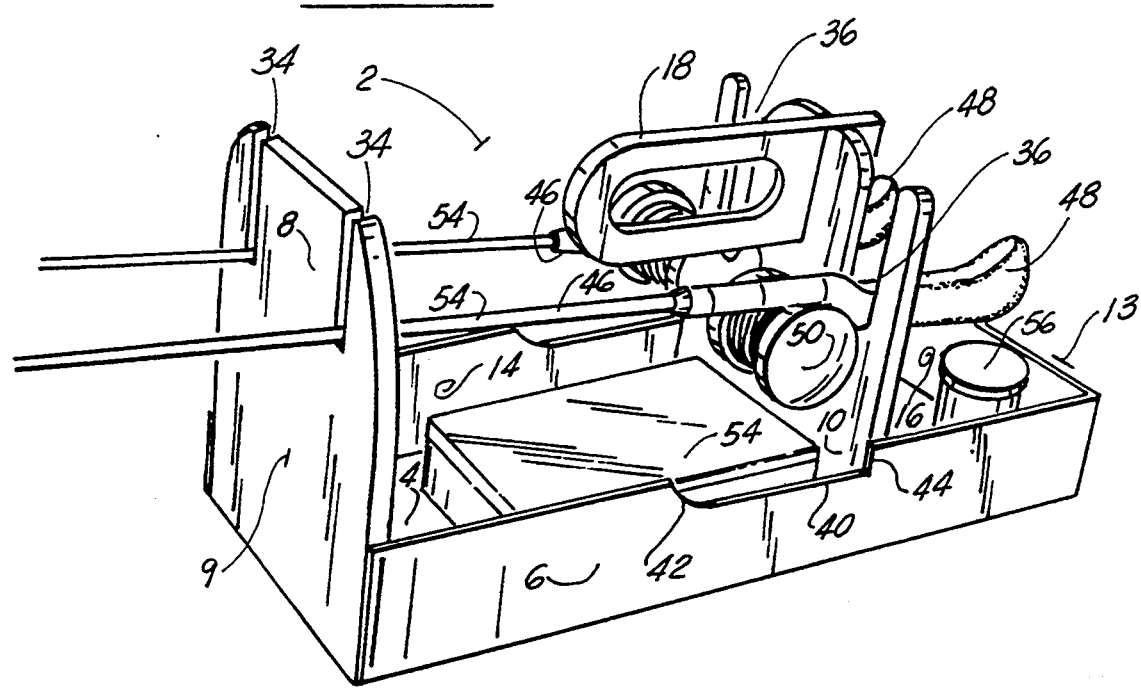
FIG. 3 is a view of the tackle box of the invention showing the carriage of fishing rods and other fishing components.

Mid-frame assembly 10 is provided with two mid-frame pole handle notches 36, each being in line with and directly behind the end of corresponding end frame pole notch 34. The end frame pole notch 34 and mid-frame pole handle notches 36 are symmetrical about a center axis of the tackle box 2, one on each side of the handle assembly 18. The mid-frame pole handle notches 36 are made of a sufficient width that a typical fishing pole handle 48, which is normally between one and a half and two inches in diameter, will fit smoothly into the notch. The depth of the mid-frame pole handle notches 36 and the end frame pole notches 34 is sufficiently great that two fishing poles may be stacked, one upon the other. The bottom fishing pole, as shown in FIG. 3, would normally be installed with the fishing reel 50 downwards, the fishing pole 46 extending through and engaged in the end frame pole notch 34 and the fishing pole handle section 48 being engaged in and held by the mid-frame pole handle notch 36. Inasmuch as the end frame pole notch 34 is significantly narrower than the mid-frame pole handle notch 36 the fishing pole rod section 52 which is, of course, much smaller in diameter than the average fishing pole handle 48, is equally snugly fit against moving or bouncing.

A second fishing pole 46 may be installed by turning the fishing pole reel up. Thus, the fishing pole rod sections 52 would be back to back.

Within the field of fishing rods the fishing pole reel 50 may be of varying sizes. Therefore, in order to provide adequate clearance for all probable fishing poles 46, a side wall reel notch 40 is formed within each side wall immediately forward of the position of mid-frame 10, and extending so as to clear any fishing pole reels 50 which may extend outward wider than the side wall 6 of the tackle box. Typically, reel notch 40 is formed with a forward sloped edge 42 and a vertical rear edge 44. Vertical rear edge 44 is in line with the front of the mid-frame 10 as, naturally, the fishing reel 50 cannot extend rearward of the mid-frame 10. It is found that providing the side wall reel notches 40 does not unduly weaken the tackle box, nor does it increase significantly the risk of spilling of any of the contents of the tackle box 2.

The described embodiment may be made easily of sheet materials, such as plywood, structural plastics or metal. The described construction is particularly amenable to formation from injection molded structural foam parts, the interlocking structure of the end and mid frames, the handle assembly spine and the base and side walls all forming s strong light weight structure. The cross bracing of the mid frame and the handle assembly spine reinforce each other, and both components being fastened together and to the base and side walls, provides strength at that point where all the loads of carrying the tackle box and contents are concentrated. Where the tackle box is built of plywood, all components are fastened by nails or screws plus glued edges. A plastic construction can be joined either by gluing or by ultrasonic welding, which forms continuous strong joints. A metal construction should be brazed or welded for proper strength.

The large storage area 14 of the tackle box is suitable for containing other boxes, such as a lure box 54 for separating lures or other large or heavier fishing tackle. Smaller fishing accessories 56 may be conveniently placed in the small storage area 16 at the rear of tackle box 2. Over a wide range of possible fishing poles 46 and fishing pole reels 50 and fishing accessories 56, 54, the box may be maintained readily in balance by sliding the hand along the elongate handle assembly grip opening 26 until a point of balance is felt for most convenient handling of the tackle box. Further, the orientation of the tackle box 2 is such that the fishing pole rod sections 52 extend out the front 9 of the tackle box 2 so that the fishing rods are always visually in front of the fisherman as he carries the tackle box 2. The fisherman may readily control the fishing rods so as not to strike or hit any object despite the general unwieldiness of carrying several fishing rods.

It can be seen from the description that the tackle box 2 provides a particularly convenient device for carrying up to four fishing rods simultaneously with the associated lures, accessories and other fishing tackle, while allowing the fisherman to control and carry all this equipment with one hand, in a balanced, safe manner. The disclosed invention thus extends beyond the described embodiment to the equivalents of the claims.

I claim:

1. A tackle box for fishermen comprising:
a base plate enclosed by an end wall and two side walls;
an end frame enclosing a front of the tackle box;
a mid-frame intermediate the end frame and the end wall, extending between the side walls, defining two storage partitions in the box;
an elongate cantilevered handle attached to the mid-frame, extending forward of the mid-frame along at least one quarter of said base plate.

2. A tackle box for fishermen comprising:
a base plate enclosed by an end wall and two side walls;
an end frame enclosing a front of the tackle box;
a mid-frame intermediate the front frame and the end wall, extending between the side walls, defining two storage partitions in the box;
an elongate handle attached to the mid-frame, extending forward of the mid-frame;
two narrow rod holding notches in the end frame;
two wider rod handle holding notches in the mid-frame;
each said rod holding notch being in line with one said rod handle holding notch.

3. A tackle box for fishermen comprising:
a base plate enclosed by an end wall and two side walls;
an end frame enclosing a front of the tackle box;
a mid-frame intermediate the front frame and the end wall, extending between the side walls, defining two storage partitions in the box;
an elongate handle attached to the mid-frame, extending forward of the mid-frame;
said handle further comprising:
a spine extending up from said base plate, attached to said mid-frame, extending perpendicular to said mid-frame;
a notch in said spine interlocking said spine with said mid-frame;
an elongate open grip extending from the top of said spine forward from said mid-frame.

* * * * *